(12) United States Patent
Pietrek et al.

(10) Patent No.: US 8,301,759 B2
(45) Date of Patent: Oct. 30, 2012

(54) MONITORING AGENT PROGRAMS IN A DISTRIBUTED COMPUTING PLATFORM

(75) Inventors: Paul Pietrek, Bellevue, WA (US); Jose Bernabeu-Auban, Sammamish, WA (US); Christopher Marsh, Kirkland, WA (US); Vamshidhar Kommineni, Bellevue, WA (US); Richard E. Wilbur, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 12/258,152

(22) Filed: Oct. 24, 2008

(65) Prior Publication Data

US 2010/0106678 A1   Apr. 29, 2010

(51) Int. Cl.
*G06F 15/173* (2006.01)

(52) U.S. Cl. ........ 709/224; 709/202; 709/203; 709/217; 709/220

(58) Field of Classification Search ................ 709/202, 709/203, 217, 220, 223, 224
See application file for complete search history.

(56) References Cited

U.S. PATENT DOCUMENTS

| | | | |
|---|---|---|---|
| 7,079,010 B2 | 7/2006 | Champlin | |
| 7,103,504 B1 | 9/2006 | McGlaughlin | |
| 7,376,736 B2 * | 5/2008 | Sundaram et al. | 709/224 |
| 7,430,590 B1 * | 9/2008 | Rive et al. | 709/220 |
| 2002/0002443 A1 | 1/2002 | Ames | |
| 2002/0107958 A1 * | 8/2002 | Faraldo, II | 709/224 |
| 2004/0010716 A1 | 1/2004 | Childress | |
| 2004/0220945 A1 | 11/2004 | Pioli | |
| 2006/0064485 A1 | 3/2006 | Baron | |
| 2007/0294369 A1 | 12/2007 | Ginter | |
| 2009/0106571 A1 * | 4/2009 | Low et al. | 713/310 |
| 2009/0259749 A1 * | 10/2009 | Barrett et al. | 709/224 |
| 2010/0106678 A1 * | 4/2010 | Pietrek et al. | 706/54 |

OTHER PUBLICATIONS

"Microsoft Mum on 'Red Dog' Cloud Computing", Aug. 26, 2008. http://opensourcepbx.tmcnet.com/news/2008/07/24/3564168.htm.

(Continued)

*Primary Examiner* — Michael Won
(74) *Attorney, Agent, or Firm* — Shook Hardy & Bacon L.L.P.

(57) ABSTRACT

Methods, systems, and computer-readable media for monitoring information passed from instances of role(s) of a service application installed on a distributed computing platform and for indexing and analyzing the information within a data store are provided. Monitoring involves a monitoring agent that is integrated within an operating system of computing devices that make up the distributed computing platform. In operation, the monitoring agent retrieves information from the role instances and converts the information into parameters that are assembled to documents. Generally, the parameters are assembled to a uniform-structured format in accordance with a schema imposed by the distributed computing platform. Accordingly, each of the documents across the platform have a common format that promotes processing and analysis without a need for reconfiguration. Accordingly, the health of the service application, although dispersed throughout the distributed computing environment, may be observed and evaluated in a consistent manner.

15 Claims, 5 Drawing Sheets

OTHER PUBLICATIONS

"Monitoring Node Performance", Aug. 26, 2008. http://technet.microsoft.com/en-us/library/cc720058.aspx.

T. Dawson et. al, "Fermilab Distributed Monitoring System (NGOP)", Aug. 26, 2008. p. 1-4, Fermi National Laboratory. Batavia, Illinois, USA. http://www.ihep.ac.cn/~chep01/paper/2-003.pdf.

"MonitorMagic Operating System Monitoring", Aug. 26, 2008. http://www.tools4ever.com/products/monitormagic/features/application-monitoring/operating-system-monitoring/.

"MCN Health Monitor", Aug. 26, 2008. http://www.osisoft.com/Products/Manufacturing+Control+Network+(MCN)+Health+Monitor.htm.

Jarra Voleynik, "eEMU: A Practical Tool and Language for System Monitoring and Event Management", Aug. 26, 2008. http://www.usenix.org/events/lisa00/full_papers/voleynik/voleynik_html/index.html.

Intellevate Prior Art Search Report. Aug. 22, 2008.

\* cited by examiner

MONITORING AGENT PROGRAMS IN A DISTRIBUTED COMPUTING PLATFORM

BACKGROUND

Typically, developers write software applications to allow for many degrees of freedom in their configuration. By way of example, these developers are able to leverage these degrees of freedom by establishing a software application that operates within specific constrains of a particular platform that is provided to support the software application. Thus, these freedoms associated with the software application enable the software application to operate in cooperation with the platform.

In one instance, this configuration of software application may be employed by application-service providers who develop the software application to operate on a platform that is remotely accessible via the Internet. In this instance, the platform executes the software program in such a way that users may remotely manipulate files using the software application. Accordingly, the platform is adapted to establish underlying elements of the software application running thereon to accommodate a current load of the remote usage. The degrees of freedom in the software application allow for scaling up or down these underlying elements and for managing the coordination therebetween.

However, the management of coordination between the underlying elements is generally inconsistent and unreliable. By way of example, the underlying elements may encounter problems in operation (e.g., nonresponsiveness, crashes, slow performance, and the like). Because the platform typically comprises various computing devices for hosting the underlying elements, it is difficult to track these operational problems across the platform. Moreover, present attempts to track performance of the software application do not consider many aspects that affect the operation of the software application, such as status of resources within the platform that are relied upon by the underlying elements or the availability of each of the underlying elements.

Current solutions to facilitate monitoring the software application rely on curators of the platform to manually observe the underlying elements individually for changes in status thereto. These ad hoc solutions are labor-intensive and error-prone. Further, these current solutions do not provide a contextual monitoring description of the software application from which to ascertain reliable analysis. These shortcomings of manual involvement are exaggerated when the platform is expansive in size, comprising a multitude of interconnected hardware components, that support the operation of a multitude of software applications.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for monitoring information passed from instances of role(s) of a service application installed on a distributed computing platform and for indexing and analyzing the information within a data store. The process of monitoring involves a monitoring agent that is integrated within an operating system of computing devices that make up the distributed computing platform. In operation, the monitoring agent retrieves information from the role instances on the same computing device and converts the information into parameters that are assembled to documents. As discussed more fully below, the documents assemble the parameters in a uniform-structured format in accordance with a schema imposed by the distributed computing platform. Accordingly, each of the documents across the platform have a common format that promotes processing and analysis without a need for translation or reconfiguration.

The process of indexing and analyzing includes automatically aggregating the documents to a central store, and, at least temporarily, retaining the documents. Once aggregated, the documents may be indexed and referenced in a set of indices that is searchable by a curator of the distributed operating platform, developer of the service application, or any other entity (e.g., a fabric controller for automatically managing the operation of the service application). Utilizing the parameters transported by the documents, analysis may be invoked to determine trends and/or failures occurring within the role instances or on other resources relied on by the role instances. Based upon results of the analysis, reports or alerts may be issued to initiate corrective measures. Accordingly, the health of the service application, although dispersed throughout the distributed computing environment may be observed and evaluated in a consistent manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer-storage media having computer-executable instructions embodied thereon that, when executed, perform methods in accordance with embodiments hereof, for monitoring information passed from instances of role(s) of a service application installed on a distributed computing platform. Generally, a monitoring agent that is integrated within an operating system of computing devices that make up the distributed computing platform is instructed to retrieve event information from the role instances and state information from resources located on the computing devices that are relied upon by the role instances during their coordinated execution. As such, the monitoring agent is configured with an awareness of which role instances, which resources, and which portions of the event/state information to collect and redistribute for analysis. This awareness allows the monitoring agent to provide a complete contextual impression of the operation of the various instances of the service application and of the resources supporting that operation. Accordingly, the contextual impression may be analyzed to determine a root cause of any failures and the original of the failures, thereby facilitating a well-informed determination of an appropriate solution.

Accordingly, in one aspect, embodiments of the present invention relate to one or more computer-readable media that has computer-executable instructions embodied thereon that, when executed, perform a method for monitoring one or more role instances of a service application. Typically, the role instances are propagated on nodes throughout a distributed computing platform. Initially, the method includes, inter alia, deploying a monitoring agent onto the nodes of a data center within the distributed computing platform. In general, the use of the term "node" refers to a computing device capable of running one or more instances of role(s) of the service application thereon. The monitoring agent may be utilized to listen to data streaming from the role instances linked thereto. Additionally, in embodiments, the monitoring agent may be utilized to construct documents from the streaming data for delivery to a central store. Typically, the documents are written to a uniform structured format common to each of the role instances of the service application. In one instance, the documents may be stored, at least temporarily, to a central store in association with the role instances to which they are related. In other instances, the documents may be delivered to the central store based on a demand from the central store or an elapse of a predefined time period.

In another aspect, embodiments of the present invention relate to a computerized method for indexing documents that encapsulate state information and event information streaming from the role instances of a service application. In general the method includes, in no particular order, integrating a monitoring agent into an operating system of a node within a distributed computing platform and automatically aggregating the documents pushed from the monitoring agent. As discussed above, the node represents a computing device capable of underlying the operation of the one or more role instances of the service application within the distributed computing platform. Typically, the documents include parameters organized in a uniform structured format that are abstracted from the state information and the event information streaming from the role instances. By way of clarification, the role instances embody replications of at least one role, which comprises a component program for supporting particular functional aspects of the service application. The method may continue by performing the following logical steps: assigning each of the documents a unique document identifier; and recursively populating the unique document identifier to a set of indices. As discussed more fully below, the set of indices is navigable for the document identifier of each of the documents based on the parameters included therein.

In yet another aspect, embodiments of the present invention relate to a computer system for performing a method that propagates streaming data from one or more role instances accommodated on computing devices in a distributed computing platform. Generally, the computer system includes a processing unit coupled to a computer storage medium, where the computer storage medium stores a plurality of computer software components executable by the processing unit. Initially, the computer software components include a service model, one or more role instances, and a monitoring agent. The service model is generally configured for exposing event definitions for invoking at least one of the role instances to compose events to the streaming data. The role instances are generally configured for publishing event information in the data stream that reflects performance of the one or more role instances. Typically, the event information includes a set of attributes consistent with the event definitions of the service model. The monitoring agent is generally configured for writing the set of attributes incorporated within the data streams to documents and for pushing the documents to delivery locations specified within the set of attributes. In embodiments, the documents are organized in a uniform structured format in accordance with a schema of the distributed computing platform.

Generally, "roles" provide a template description of a functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings which are shared by all instances of the role, or individual settings that are particular to each instance of the role. In an exemplary embodiment, the roles each represent a particular class of component of the service application. Typically, the service model delineates how many instances of each of the one or more roles to place within the data center, where each of the instances is a replication of the particular class of component, or role. In other words, each role represents a collection of instances of each class of components, where the service application may have any number of classes of components for carrying out functions thereof.

In embodiments, a service model is employed to determine which attributes, or a set of attributes, are to be conveyed from the instances of the roles of the service application. As utilized herein, the phrase "service model" is not meant to be limiting and generally refers to any communication that includes information pertaining to establishing and managing instances of a service application within a data center. Generally, the service model is an interface blueprint that provides instructions for managing component programs of the service application. The service model acts to guide a fabric controller in coordinating activities between the deployed component programs upon deployment to distributed locations throughout the distributed operating environment. In one instance, the service model includes a description of which roles of the service application are to be established, or how the instances of each of the roles are to be installed and activated within the data center. That is, the service model serves as an articulation of which roles should be running for the service application and conditions for where instances of the roles should be installed.

In a particular instance, the service model may include event definitions that are employed to specify a set of attributes that each of the role instances is to convey within the event information. Further, the "event definitions," as used herein, provide a consistent guideline for specifying which events are to be declared by a role instance as event information and when events are to be declared. By way of example, specifying which events are to be declared may involve limiting declaration of events that occur on a role instance to those that match predefined events established by the event definitions. By way of example, specifying when events are to be declared may involve installing event-counters at role instances. In embodiments, the event-counters are configured to enumerate instances of a predefined event that occur in relation to the role instances. Again, these predefined events may be identified by the event definitions maintained in the service model. Upon ascertaining that the enumerated instances of the predefined event meet a predetermined threshold, the event may be declared within the event information. As such, these and other aspects of declaring events are governed by the event definitions. Accordingly, events are consistently declared as event information across the role instances.

Employing the event definitions to specify the set of attributes to be conveyed within the event information facilitates consistently articulating a complete and accurate description of the event. The phrase "set of attributes," as utilized herein, is not meant to be limiting, and may include any event information such as program traces or another recordation of event characteristics, an indication of the role instance or of the service application, a time stamp, a severity level as determined by the role instance, a location for delivery of the declared event, and the like. Because the events are declared with a consistent set of attributes in accordance with the service model, analytical tools may be general purpose, rather than ad hoc targeted to individual components.

Although various different configurations of the event information that are passed to the set of attributes have been described, it should be understood and appreciated by those of ordinary skill in the art that other types of suitable configurations that provide event information as streaming data may be used, and that embodiments of the present invention are not limited to the exemplary sets of attributes described herein. For instance, event information may be structured with discrete parameter values for easy programmatic usage.

Along with the event information from the role instances, the streaming data collected by the monitoring agent may include state information. The state information may be declared by any resource or component residing on a similar node as the monitoring agent. Or, the state information may be declared by any resource or component that is in communication with the monitoring agent or the role instance(s) that the monitoring agent is established to observe. Generally, utilization of the phrase "state information" is not meant to be limiting and broadly refers to data that describes a snapshot of a state of a software or hardware element encompassed within the distributed computing environment. In examples, the state information may include counter values (e.g., a count generated by event-counters installed at role instances or other resources), properties of resources or channels implemented within a data center, hardware-related data, operating system performance, a change in state of a role instance, a notification of a new or vacated role instance/resource, and the like.

Although various differing types of state information passed to the monitoring agent have been described, it should be understood and appreciated by those of ordinary skill in the art that other types of suitable types of data provided in the streaming data to the monitoring agent may be used, and that embodiments of the present invention are not limited to those embodiments of exemplary state information described herein. In operation, the monitoring agent may aggregate the state information as well as the event information, and construct documents therefrom. Accordingly, the varied information passed to the monitoring agent from disparate locations may be automatically compiled and relayed to a central store for indexing and analysis. This is more fully discussed below with reference to FIG. 2.

Having briefly described an overview of embodiments of the present invention, an exemplary operating environment suitable for implementing embodiments of the present invention is described below.

Figure 1:
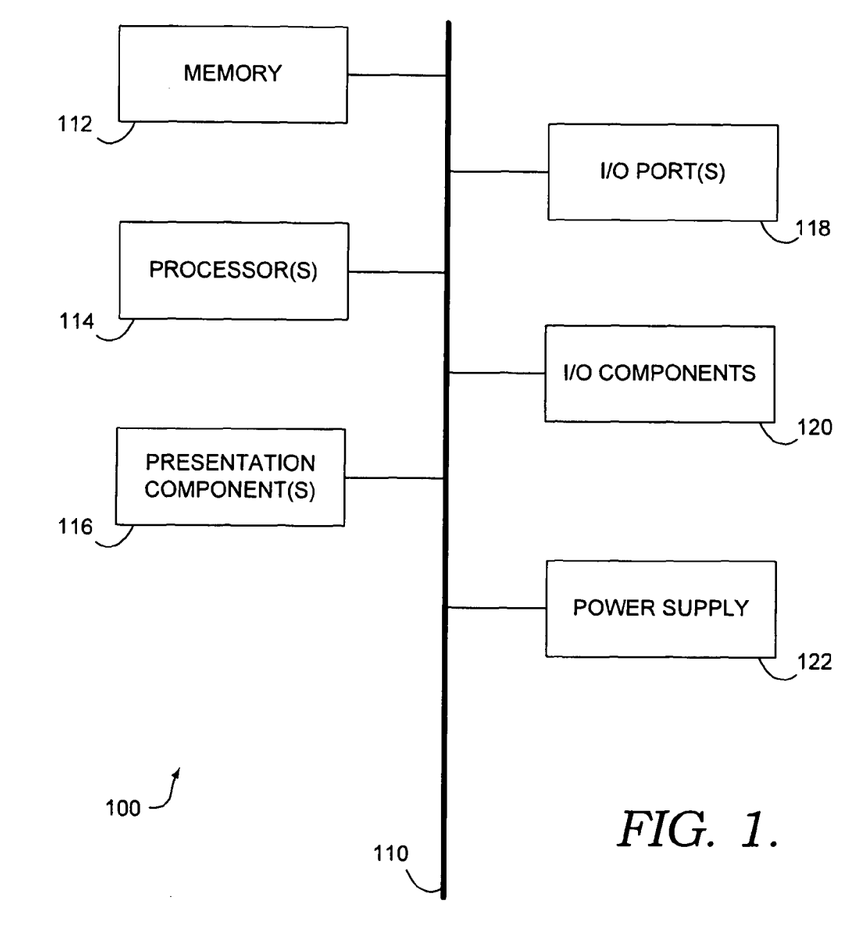
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-usable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including hand-held devices, consumer electronics, general-purpose computers, specialty computing devices, etc. Embodiments of the invention may also be practiced in distributed computing platforms where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
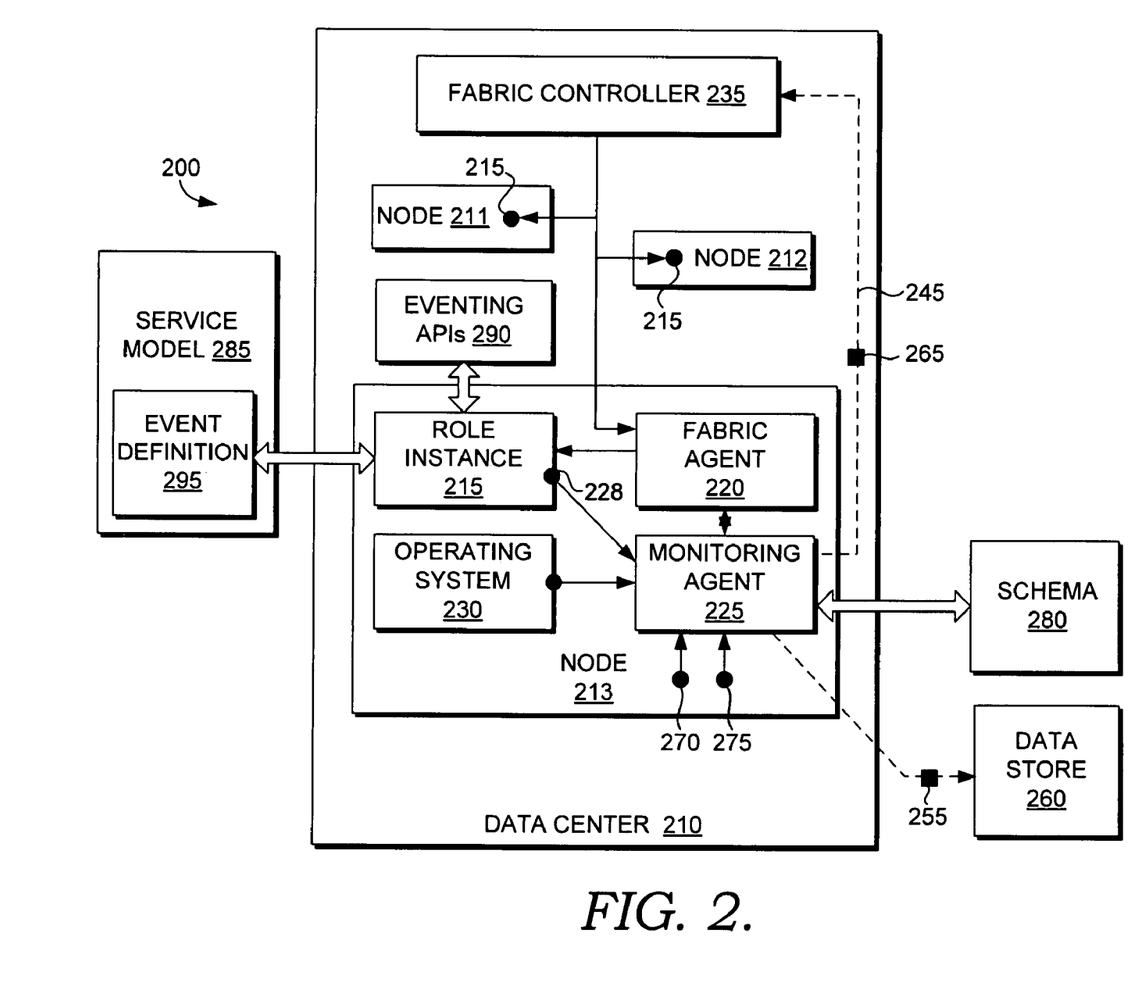
FIG. 2 is a block diagram illustrating a distributed computing environment, suitable for use in implementing embodiments of the present invention, that is configured to monitor operation of role instances of a service application according to a service model.

Turning now to FIG. 2, a block diagram is illustrated showing a distributed computing environment 200, suitable for use in implementing embodiments of the present invention. Generally, the distributed computing environment 200 is configured to monitor operation of role instances 215 of a service application according to a service model 285. The distributed computing environment 200 includes a data center 210 configured to accommodate and support operation of component programs, or instances of roles, of a particular service application according to the service model 285. It will be understood and appreciated by those of ordinary skill in the art that the data center 210 shown in FIG. 2 is merely an example of one suitable for accommodating one or more service applications and is not intended to suggest any limitation as to the scope of use or functionality of embodiments of the present invention. Neither should the data center 210 be interpreted as having any dependency or requirement related to any single resource, combination of resources (e.g., resources 270 and 275), or set of APIs to access the resources (not shown). Further, although the various blocks of FIG. 2 are shown with lines for the sake of clarity, in reality, delineating various components is not so clear, and metaphorically, the lines would more accurately be grey and fuzzy.

The data center 210 includes various resources 270 and 275, an operating system 230, the role instance(s) 215, a fabric agent 220, and a monitoring agent 225 that are interconnected. In addition, the role instance(s) 215 may be interconnected to the service model 285 and/or eventing application programming interfaces (APIs) 290, while the monitoring agent 225 may be interconnected to a schema 280 and/or a data store 260. In one instance, one or more of these interconnections may be established via a network cloud (not shown). These resources, as described herein, may include software components (e.g., fabric controller 235) as well as tangible computing elements, such as nodes 211, 212, and 213. The network cloud interconnects these resources such that the role instances 215 of service applications, which may be distributably placed across various physical resources, may recognize a location of other instances in order to establish communication therebetween. In addition, the network cloud facilitates this communication over channels connecting the instances of the service application and any other elements required by the service model 285. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

Generally, the data center 210 provides underlying support for operation of the service application within the distributed computing environment 200. In particular, the nodes 211, 212, and 213 may accommodate a plurality of component programs, or the role instance 215 of the service application, running independently on an operating system 230 installed on one or more of the nodes 211, 212, and 213. As described supra, the term "node" is not meant to be limiting and may encompass any computing device capable of executing the role instances 215 in support of the service application. Moreover, the nodes 211, 212, and 213 may represent any form of computing devices, such as, for example, a personal computer, a desktop computer, a laptop computer, a handheld device, a mobile handset, consumer electronic device, and the like. In one aspect, the nodes 211, 212, and 213 represent a computing device of a plurality of distributed computing devices interconnected via the network cloud. Generally, these distributed computing devices are capable of executing a plurality of instances 215 of various roles of the service application. In one instance, a particular node may be capable of accommodating two or more role instance(s). These role instances 215 may run on the nodes 211, 212, and 213 in complete isolation (i.e., imposing a high level of security on the service application), in partial communication with instances of other roles, or in an interactive state with one or more other roles of the service application.

Although two different configurations of the interconnection of the role instances 215 and other components and resources have been described, it should be understood and appreciated by those of ordinary skill in the art that other types of suitable communication pathways that facilitate the communication (e.g., streaming data) may be used, and that embodiments of the present invention are not limited to those communication pathways described herein. For instance, the nodes 211, 212, and 213 may be typically operably coupled with each other via the channels established across the data center 210.

With continued reference to FIG. 2, the monitoring agent 225 may be installed to monitor one or more role instances 215 of a service application propagated throughout a distributed computing platform 200. Initially, the monitoring agent 225 may be a software application deployed onto a node 213 of the data center 210. In one instance, the monitoring agent 225 may be built into the operating system 230 of the node 213 to act as a service process for supporting diagnostics of the service application. In another instance, the monitoring agent 225 may be tightly integrated with components (e.g., the resources 270 and 275) built into the node's 213 base-deployed operating system 230.

The monitoring agent 225 may be automatically triggered to begin its operations upon a boot-up of the node 213. However, persons familiar with the field of the invention will realize that the automatic trigger to operate may be invoked by various other circumstances, which are different from the specific illustrated embodiment. For instance, the operation of the monitoring agent 225 may be automatically triggered by information received from any of the components 215, 220, 230, 270, and 275. In operation, the monitoring agent 225 functions as a nonobstructive component for observing performance of the role instances and other components on the node 213 in which it is installed. Further, the monitoring agent 225 may serve as a pipeline for pushing data from the node 213 to the data store 260.

In embodiments of the operation of the monitoring agent 225, the monitoring agent 225 may listen to data streaming from the role instances 215. As more fully discussed above, the role instances 215 embody replications of at least one role that comprises a component program for supporting particular functional aspects of the service application. The process of listening may include receiving, in the form of the streaming data, event information from the role instances 215. The event information may be configured to communicate, at least, an alarm (discussed below), program traces, and the like, to the monitoring agent 225. Further, the event information may be configured to carry a set of attributes that describes a predefined event, as specified by the event definition 295 residing in the service model 285.

In an exemplary embodiment, the monitoring agent 225 listens to streaming data that carries the event information via Event Tracing for Windows® (ETW). In embodiments, ETW is a general-purpose, high-speed, tracing facility provided by the operating system 230. Using a buffering and logging mechanism, ETW provides a tracing mechanism for event information raised by the role instances 215. Additionally, ETW provides the ability to enable and disable logging dynamically, allowing the monitoring agent 225 to perform detailed collection of data intermittently without requiring reboots or service application restarts.

In one instance, an ETW provider 228 may be implemented at each of the role instances 215 for providing the event information in an ETW format. Typically, implementing the ETW provider 228 may be accomplished by eventing APIs 290 that are linked to the role instances 215. The eventing APIs 290, in conjunction with the event definitions 295, are configured for assigning each of the role instances 215 a unique identifier (e.g., a globally unique identifier (GUID)), and for publishing the unique identifier of each of the role instances 215 to the monitoring agent 225. Accordingly, upon implementing the ETW provider 228 at each of the role instances 215 and publishing the unique identifiers, the monitoring agent 225 can arbitrarily listen to, filter out, and decode information from each of the ETW providers 228. Further, upon making the unique identifiers of the role instances 215 available to the monitoring agent 225, the monitoring agent 225 may identify the received event information received from the ETW providers 228 of each role instance 215 and isolate the event information according to the identity of its source. Accordingly, the monitoring agent 225 may associate the event information with each of the role instances 215 and separate the event information during construction of the documents 255.

In embodiments of the operation of the monitoring agent 225, the monitoring agent 225 may further listen to data streaming from components installed on the node 213. In one instance, the process of listening may include actively collecting data, or passively accepting streaming data, from resources 270 and 275 located on the node 213. The data from the resources 270 and 275 may provide a context for evaluating the performance of the service application. Also, the data from the resources 270 and 275 may provide an indication of the health of the role instance 215 that relies thereon for functional purposes (e.g., processing inputs and outputs of the role instance 215).

In another instance, the process of listening may include extracting various types of data from the operating system 230. Generally, the operating system 230 represents a processing component (e.g., CPU) that manages the sharing of the data across the resources/components of the node 213 and provides programmers with an interface used to access those resources/components. This extracted data may be related to performance aspects of the hardware comprising the node 213 or the software components accommodated thereby. By way of example, the data extracted from the operating system 230 by the monitoring agent 225 during the listening process may include available main memory, available CPU, and the like.

The process of listening may include receiving, in the form of the streaming data, state information from a fabric agent 220. Generally, the fabric agent 220 is a local extension of a fabric controller 235. Further, the fabric agent 220 may be embedded into the node 213 of the data center 210 in order to install and manage components (e.g., the role instance 215, the monitoring agent 225, and the like) according to instructions from the service model 285 and/or the fabric controller 235. In embodiments, the fabric controller 235 is responsible for managing the role instances 215 deployed on the various nodes 211, 212, and 213 distributed through the data center 210. This management may be carried out with respect to constraints articulated by the service model 285. As discussed above, the state information portrays a snapshot of a state of the role instances 215, such as counter values that represent an enumeration of predefined events occurring at role instances 215. The state information may also include any state changes to the role instances 215, such as new deployment of a role instance, an update to a role instance, an abandonment/failure of a role instance, etc.

In an exemplary embodiment, the fabric agent 220 and the monitoring agent 225 are adapted to communicate bidirectionally. As mentioned above, the fabric agent 220 may inform the monitoring agent 225 of state information. Meanwhile, the monitoring agent 225 may communicate hardware-related events occurring on the node 213 of the data center 210 to the fabric controller 235 via the fabric agent 220. These hardware-related events may be ascertained from the monitoring agent's communications with the operating system 230, or any other component installed on the node 213. Upon receiving the communication of the hardware-related events, the fabric controller 235 is further configured to evaluate these events to determine a course of action for coordinating the operation of the role instances 215 of the service application. Based on the evaluation of the hardware-related events, the course of action may involve the fabric controller 235 initiating an update to an awareness of the monitoring agent 225 via the fabric agent 220.

As utilized herein, the "awareness" of the monitoring agent 225 refers to a variety of platform concepts used to comprehensively observe and report operations of the service application. One of the platform concepts comprising the awareness is an understanding to which actively operating role instances 215 of the service application the monitoring agent 225 should monitor. Another platform concept comprising of the awareness of the monitoring agent 225 relates to which portions of the event information and the state information to transfer to documents 255. For instance, with respect to this platform concept, updating the awareness of the monitoring agent 225 may involve the fabric controller 235 instructing the monitoring agent 225 to vary which parameters are assembled to the documents 255, where the parameters are collected from the set of attributes in the streaming data originating from the role instances 215. As such, by updating the awareness of the monitoring agent 225, there is no need to continuously redeploy new monitoring agents 225 to the node 213 upon the awareness of the current monitoring agent 225 becoming outdated.

One of ordinary skill in the art will realize that other platform concepts, beyond the two discussed above, that influence the awareness for the monitoring agent 225 may exist, and those other platform concepts are contemplated by the present invention. Further, the awareness may be dynamic and may be updated based on changes to the configuration of the distributed computing environment 200 as well as changes to the service application running thereon. Accordingly, the awareness of the monitoring agent 225 allows the monitoring agent to adapt to changes and consistently provide relevant, current, and useful information via the documents 255.

Upon collecting the streaming data via the monitoring agent 225, documents 255 are constructed from the streaming data for delivery to the data store 260. Generally, the "documents" represent any form of communication that can transport information from one component to another. In an exemplary embodiment, the documents 255 are written to a uniform structured format common to each of the role instances 215 of the service application. That is, the documents 255 may be organized to the uniform structured format in accordance with a schema 280 imposed by the distributed computing platform 200. Accordingly, the collected data is represented in the documents 255 in a consistent structure, thereby facilitating evaluation of the collected data with a general purpose analytical tool as opposed to a specialized set of applications for processing custom transmission specific to each transmitting component.

The documents 255 may exhibit a variety of properties while maintaining the uniformed structured format. For instance, the documents 255 may be schematized and self-contained (e.g., absent external references to other documents) so that a document lost does not affect the usability of other documents stored in the data store 260. In another instance, the documents 255 may include some of the parameters in the form of metadata, such as an identifier of the role instance 215, a name of the node 213, a time the streaming data was collected, and so on. Although various examples of the documents 255 are discussed, it is emphasized that the present invention is not limited only to these embodiments, but embraces a wide variety of forms, which persons familiar with the field of the invention will realize.

In one instance, constructing the documents 255 refers to writing the set of attributes incorporated within the data streams to the documents 255. As mentioned above, the data streams may include state and/or event information that hold respective sets of attributes as specified by the event definition 295 of the service model 285. These event definitions 295 may be established by a curator of the distributed computing environment 200, created by a developer of the service application, automatically updated by the fabric controller 235, or influenced by another entity that is associated with the proper operation of the service application. Typically, the process of writing the set of attributes incorporated within the data streams to the documents 255 involves converting data within the set of attributes to parameters that are assembled to the uniform structured format of the documents 255. In instances, the awareness of the monitoring agent 225 governs which data comprises the set of attributes to be converted and transmitted within the documents 255.

Consequently, upon constructing the documents 255, the documents 255 may be pushed to delivery locations. These delivery locations may be specified within the set of attributes of the streaming data, maintained by the monitoring agent 225, or established by another component that communicates, either directly or indirectly, with the monitoring agent 225. In an exemplary embodiment, the role instances 215 may designate a particular delivery location based on whether an alarm is raised. In particular, one or more of the role instances 215 may decide to raise an alarm based on events detected by the role instances 215. For instance, a role instance 215 may identify at least one event occurring thereon as an alarm event (e.g., critical failure of the role instance 215, disconnection with the resources 270 and 275, disconnection with a memory location or another role instance, and the like). The event definitions 295 of the service model 285 may be utilized to drive this identification. Upon identifying an alarm event, the role instance 215 may initiate raising the alarm. In one embodiment of raising the alarm, the role instance 215 may incorporate an alarm within the set of attributes, conveyed within the event information, to instruct the monitoring agent 225 to assemble an indication of the alarm to the uniform structured format of a corresponding document 225. Additionally, the role instance 215, may incorporate the alarm within a communication that is reported to another entity, such as the fabric controller 235, to elicit an immediate response.

In another embodiment of raising the alarm, the monitoring agent 255 detect the alarm event, or a high-severity level of an event, issued within the streaming data and derives a document 265 from the set of attributes that express the alarm event. This document 265 may be constructed concurrently with the document 255 providing the alarm event to the data store 260, or in place of the document 255. Further, the document 265 may be routed based on a delivery location, known to the monitoring agent 255, associated with a type of alarm event being signaled. By way of example, the delivery location may be the fabric controller 235, which may reconfigure the service application to survive the failure or disconnect that triggered the alarm event. In another example, the document 265 transporting the alarm event may be routed along a communication pathway 245 built within the data center 210 for expedited conveyance of the alarm event. In an exemplary embodiment, properties and routing of the communication pathway 245 are ascertained from the set of attributes that includes the alarm event. Accordingly, the process of raising an alarm is substantially aligned with the standard procedure for conveying event information from the role instance 215 as opposed to necessitating separate agents and processes to handle failures within the distributed computing system 200.

In embodiments, one of the delivery locations designated for receiving the documents 255 may be a central store (see reference numeral 310 of FIG. 3) within the data store 260. The central store may request the documents 255 by sending a demand to the monitoring component 225, or the monitoring component 225 may actively forward the documents 255 upon the elapse of a predefined time period. Upon receipt, the central store is configured to, at least temporarily, store the documents 255 in association with the role instances 215 from which the documents' 255 parameters originated.

The data store 260 and the central store (see reference numeral 310 of FIG. 3) are generally configured to store information associated with the event and state information declared from a variety of components residing on one or more nodes 211, 212, and 213 of the data center 210. In addition, data store 260 and the central store may be configured to be searchable for suitable access of stored information. For instance, the central store may be searchable for one or more documents associated with a document identifier (discussed below) selected for processing. It will be understood and appreciated by those of ordinary skill in the art that the information stored in the central store may be configurable and may include any information relevant to the performance of the service application. The content and volume of such information are not intended to limit the scope of embodiments of the present invention in any way. Further, though illustrated as a single, independent component, the data store 260 and the central store may, in fact, be a plurality of databases, for instance, a database cluster, portions of which may reside on the node 213, within the data center 210, another external computing device (not shown), and/or any combination thereof.

Figure 3:
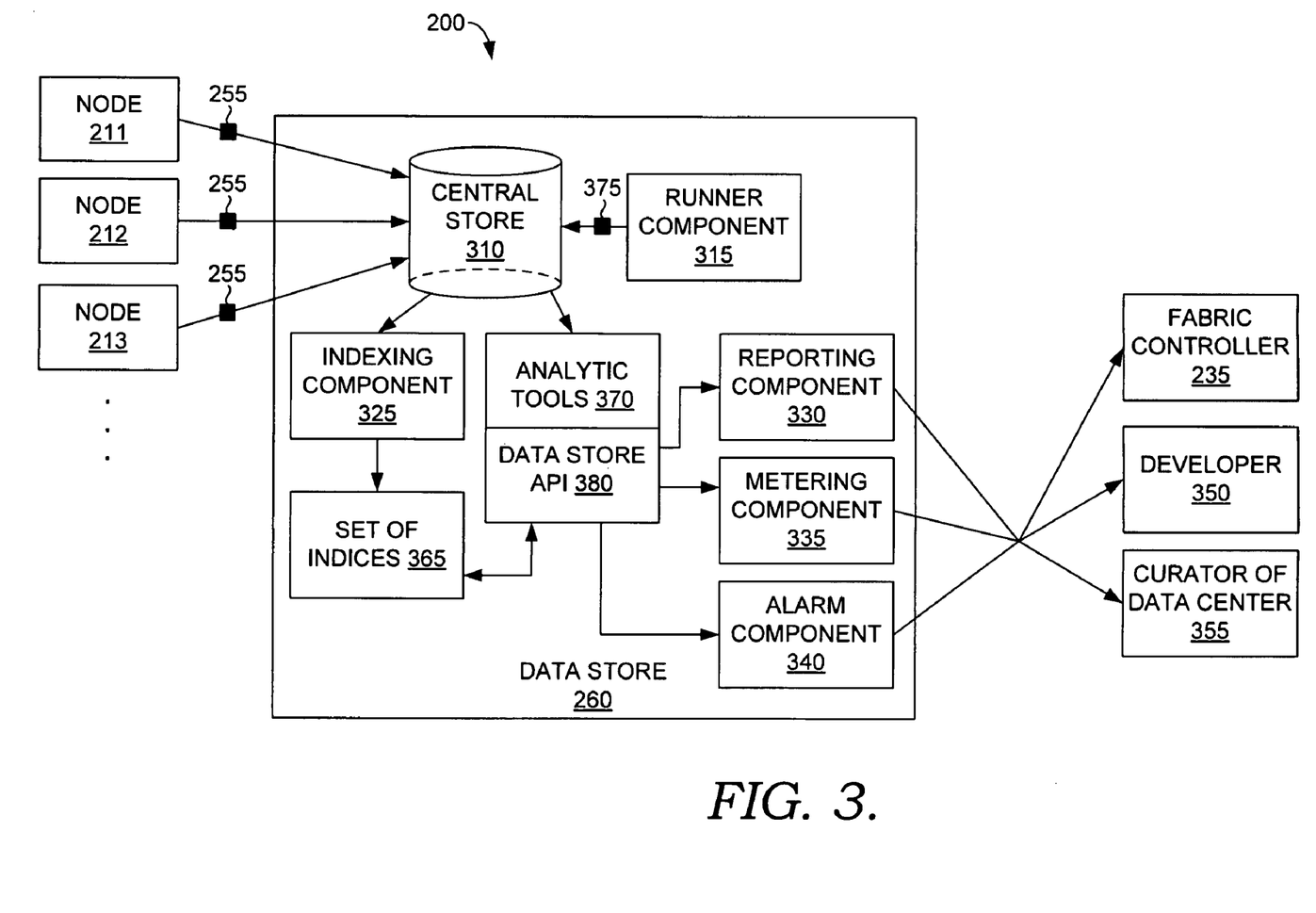
FIG. 3 is a block diagram illustrating the distributed computing environment, suitable for use in implementing embodiments of the present invention, that is configured to automatically aggregate documents reflecting performance of the role instances of the service application.

Turning now to FIG. 3, a block diagram illustrating the distributed computing environment 200, suitable for use in implementing embodiments of the present invention, that is configured to automatically aggregate documents 255 reflecting performance of the role instances of the service application is shown. Initially, the distributed computing environment 200 includes a data store 260 for carrying out such processes as automatically aggregating the documents 255 conveyed from monitoring agents installed on the nodes 211, 212, and 213 of a data center, indexing the documents 255 by way of document identifiers, and analyzing contents of the documents 255 to measure the health of the service application. These processes are implemented at one or more of the central store 310, a runner component 315, an indexing component 325, a reporting component 330, a metering component 335, an alarm component 340, a set of indices 365, analytical tools 370, and a data store API 380, which comprise the data store 260. Initially, the central store 310 conducts the process of automatically aggregating the documents 255 abstracted from data streams. Automatic aggregation may traverse various time increments and/or across the nodes 211, 212, 213, and others supporting the service application. In addition, the central store 310 maintains the documents 255 for analysis and review for a predetermined period of time. That is, in a continuously running distributed hosting environment 200, there will be a steady stream of documents 255 to the central store 310. Because the central store 310 and the associated set of indices 365 cannot grow indefinitely, a mechanism to auto age the documents 255 may be put into place. Accordingly, when a portion of the documents 255 have been stored in the central store 310 longer than a predefined threshold, that portion may be deleted and references to those documents 255 deleted from the set of indices 365.

Generally, the central store 310 functions as a structured repository such that documents 255 are referenced by the set of indices 365 and may be retrieved upon being selected within the set of indices 365. In embodiments, the central store 310 may be configured as a universal naming convention (UNC) share that utilizes a naming convention to specify and map the documents 255 in a hierarchical namespace structure to facilitate access to the appropriate documents 255. In other embodiments, the central store 310 could be configured as distributed cloud storage. Further, persons familiar with the field of the invention will realize that storage of the documents 255 may be practiced by various conventions, which are different from the specific illustrated embodiments.

As the documents 255 arrive in the central store 310 from monitoring agents, the indexing component 325 initiates the indexing process that assigns the documents 255 a unique index value, such as a document identifier. In one instance, the document identifier is assigned according to parameters arranged in the uniform structured format of the documents 255. In another instance, the document identifier is assigned according to aspects of the metadata incorporated into the documents 255, as discussed more fully above. Upon assigning document identifiers to the documents, the indexing process may proceed to recursively populate the unique document identifiers to the set of indices 365, where the set of indices 365 may be navigable for the document identifier of each of the documents 255 based on the parameters included therein. In addition, the indexing process includes iterating through the documents 255 presently stored in order to update the set of indices 365.

The set of indices 365 created by the above process can be stored in a relational database (e.g., SQL Server), or in a distributed, in-memory system (e.g., XTable). The set of indices 365 may be recursively populated with references to the stored documents 255 that are appended to the document identifiers. Accordingly, because navigation through the set of indices 365 returns document identifiers and associated references to the documents 255, the exact storage location of indexed documents 255 is irrelevant. That is, the references associated with document identifier(s) that satisfy a query, which is used to navigate the set of indices 365, reveal the location of the proper documents 255.

In an exemplary embodiment, the set of indices 365 provide an index management capability by generating and continuously updating an index key. The index key may include searchable categories such as key words or a type of event, thereby facilitating searching across the indexed documents 255. In one instance, the searchable categories are derived from the parameters of the documents 255 presently stored in the central store 310 or elsewhere. In operation, the index key may be navigated by, at least, the following steps: receiving a query issued from a caller; comparing the query against the index key to discover the documents 255 that satisfy the query; and returning document identifiers associated with the discovered documents 255. In embodiments, the caller may include a curator of the data center 355, a developer of the service application 350, the fabric controller, or any other entity capable of issuing a query.

Upon attaining the returned document identifiers, the references associated therewith may be utilized to locate the central store 310 as the memory location holding the discovered documents 255, while the document identifiers may be used to interrogate the central store 310 to produce the documents 255 associated with the document identifiers. In embodiments, the discovered documents 255 may be produced to the caller or an entity designated by the caller. In other embodiments, the documents 255 may be discovered in response to a call from the analytical tools and provided thereto.

In embodiments, the analytic tools 370 may be implemented to analyze performance of the service application. Initially, the process of analyzing may include accessing the proper documents 255 for a particular evaluation. The documents 255 may be accessed by querying the set of indices and/or filtering the documents 255 aggregated to the central store 310 based on evaluation criteria. Once an appropriate group of the documents 255 is gathered, these documents 255 are evaluated to ascertain performance aspects therefrom. Evaluating may include inspecting these documents 255 to ascertain whether the parameters included therein are substantially comparable to expected parameters. Upon ascertaining the parameters are incomparable, a root cause of the unexpected parameters and an origin thereof may be identified. In embodiments, the root cause, the origin of the root cause, and/or any other pertinent information is offered in a report. The report may be forwarded to a caller that initiated the evaluation, to the fabric controller 235 for implementing a corrective measure, or any other data consumer designated for receiving analytical information related to the service application.

The corrective measures that are implemented by the fabric controller 235 may be selected in accordance with contents of the report. These contents of the report may include one or more of various types of analysis of the parameters transported in documents. In one instance, these documents may be pushed from single nodes or the nodes 211, 212, and 213 in aggregate. In another instance, these documents may include parameters derived from all the instances of a role, all the roles instances residing on a node, or all the nodes within a particular data center. Further, examples of the corrective measures that are implemented by the fabric controller in response to the reports may include terminating an instance of a role or invoking a notice in a ticketing system. Typically, the ticket system is built to provide notices to specific data consumers via specific modes of communication upon recognizing particular contents within a report. Examples of providing notices to specific data consumers via specific modes of communication include, but are not limited to, paging the curator of the data center 355, displaying a UI with an appropriate corrective action to a remote client, or generating an email alert to transmit to the developer of the service application 350.

In embodiments, the analytic tools 370 are written against the events that occurred to generate the documents 255. Accordingly, the dynamically written analytical tools 370 provide a relevant analysis of the documents 255 that corresponds with the most recent events occurring within the distributed computing environment 200. In addition, the indexing component 325 and the analytic tools 370 may comprise a plurality of scalable role-based components, thus, eliminating a single performance chokepoint.

In embodiments, a reporting component 330 is provided for determining the proper data consumers to receive the report and for facilitating delivery thereto. Delivering the report to the data consumer may be initiated upon a demand from the data consumer, which may include a request for a particular evaluation, or upon an automatic delivery scheme. One such reporting scheme may be a quality-of-service scheme that regularly triggers the production of reports and the delivery of the reports to the curator of the data center 355 for monitoring the health of the role instances of a service application. In effect, the quality-of-service scheme allows the curator of the data center 355 to make more informed decisions about resource allocation. In other embodiments, a metering component 335 for monitoring a status of predefined components, an alarm component 340 for recognizing an alarm event generated by a role instance, and the reporting component 330 may be linked to the analytic tools 370 via a data store API 380.

A runner component 315 may be provided within the data store 260 or at another location in the data center. In general, the runner component 315 is a dedicated process to periodically exercise major paths of the distributed computing system 200, usually by simulating an external request. The external request may be used to infer the health or availability of a component or resource within the distributed computing environment 200. The process of simulating the external request may begin by proactively observing the streaming data of the role instances, the resources, or other components. Based on the streaming data, the runner component 315 may self-initiate a simulated document 375 to exercise communication paths within the data center. By way of example, the simulated document 375 may be conveyed on a communication path to the central store 310 to mimic the activity of a monitoring agent. Further, the simulated document 375, in conjunction with the documents 255 aggregated in the central store, may be utilized to provide an enhanced analysis of the data center and the components therein.

This distributed computing environment 200 is but one example of a suitable environment that may be implemented to carry out aspects of the present invention, and is not intended to suggest any limitation as to the scope of use or functionality of the invention. Neither should the illustrated exemplary system architecture of the distributed computing system 200 be interpreted as having any dependency or requirement relating to any one or combination of the components 310, 315, 325, 330, 335, 340, 365, 370, and 380 as illustrated. In some embodiments, one or more of the components 310, 315, 325, 330, 335, 340, 365, 370, and 380 may be implemented as stand-alone devices. In other embodiments, one or more of the components 310, 315, 325, 330, 335, 340, 365, 370, and 380 may be integrated directly into the central store 310 or the fabric controller 235. It will be understood by those of ordinary skill in the art that the components 310, 315, 325, 330, 335, 340, 365, 370, and 380 illustrated in FIG. 3 are exemplary in nature and in number and should not be construed as limiting.

Accordingly, any number of components may be employed to achieve the desired functionality within the scope of embodiments of the present invention. Although the various components of FIG. 3 are shown with lines for the sake of clarity, in reality, delineating various components is not so clear, and metaphorically, the lines would more accurately be grey or fuzzy. Further, although some components of FIG. 3 are depicted as single blocks, the depictions are exemplary in nature and in number and are not to be construed as limiting (e.g., although only central store 310 is shown, many more may be communicatively coupled to the monitoring components).

Figure 4:
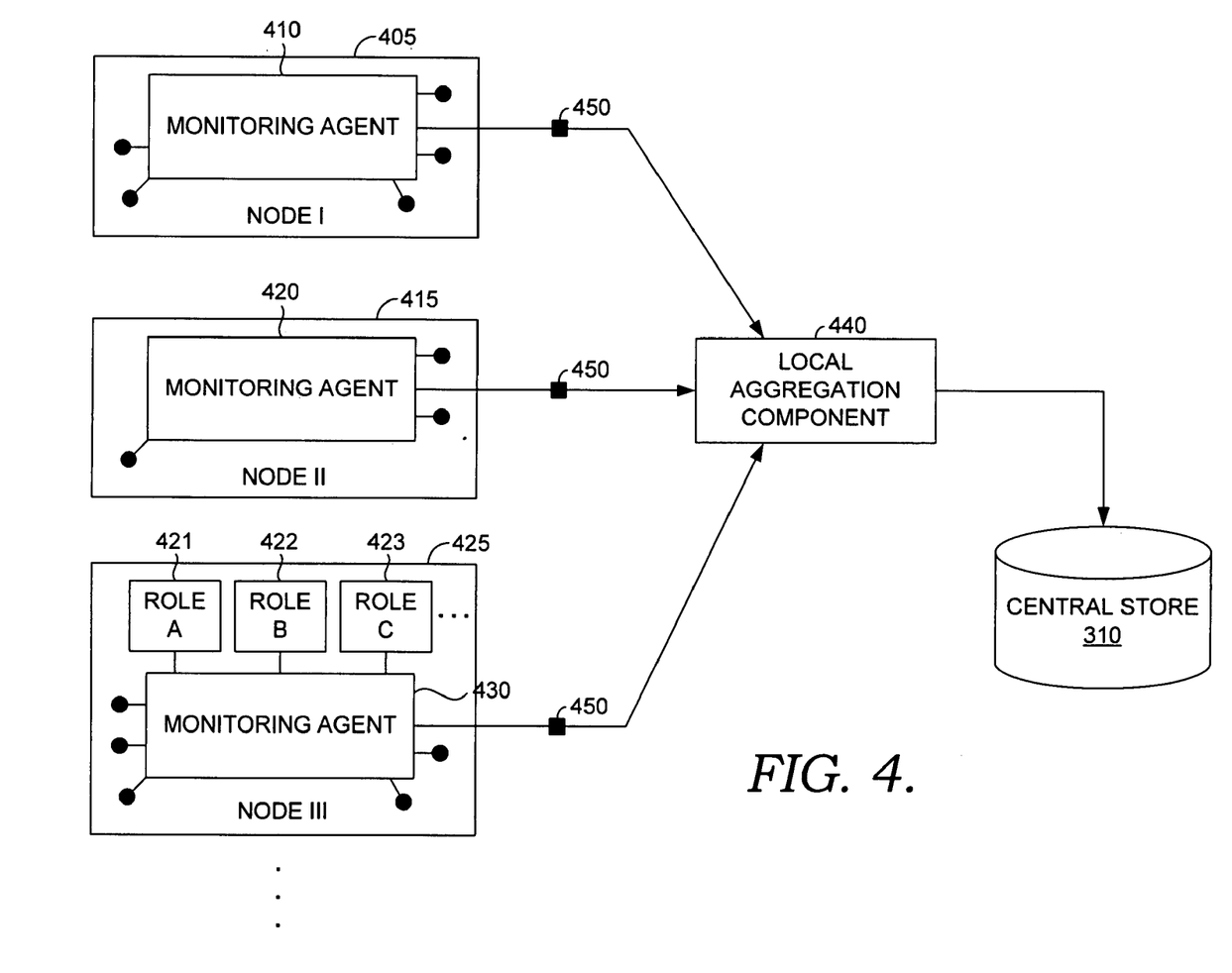
FIG. 4 is a graphical representation of an exemplary local aggregation component for summarizing parameters transported in documents, in accordance with an embodiment of the present invention.

Turning now to FIG. 4, a graphical representation illustrating an exemplary local aggregation component 440 for summarizing parameters transported in documents is shown, in accordance with an embodiment of the present invention. In scenarios more fully discussed above, event and state information are conveyed in a data stream to monitoring agents. But, the destination of the streaming data is not restricted to a single location, such as the monitoring agent. Based on the delivery location integrated within the set of attributes conveyed in the data stream, events and other information may be passed on to other locations, such as role instances (e.g., instances 421, 422, and 423 of roles A, B, and C respectively).

In other scenarios, documents 450 transporting the events may be passed on to the local aggregation component 440. Local aggregation, provided by the local aggregation component 440, is useful when multiple nodes (e.g., nodes I 405, II 415, and III 425) are performing similar logical activity (e.g., servicing file requests). Accordingly, generating an overall view of the activity across the nodes I 405, II 415, and III 425 is more desirable than redundant documents 450 being stored to the central store 310.

In yet other scenarios, monitoring agents 410, 420, and 430 that are integrated onto the nodes I 405, II 415, and III 425 may serve as aggregation components. That is, the monitoring agents 410, 420, and 430 may summarize activity, and the events resulting therefrom, on each of the nodes I 405, II 415, and III 425 locally, instead of delivering a multitude of streams of unprocessed documents to the central store. By way of example, the monitoring agent 430 may summarize the events from the components (e.g., instances 421, 422, and 423 of roles A, B, and C respectively) on the node III 425, as opposed to installing three separate monitoring agents that convey three separate streams of documents. Accordingly, the summaries of events assembled into the documents 450 that are pushed from the monitoring agent 430 are comprehensive yet succinct and impart minimal strain on the faculties of the central store 310.

Figure 5:
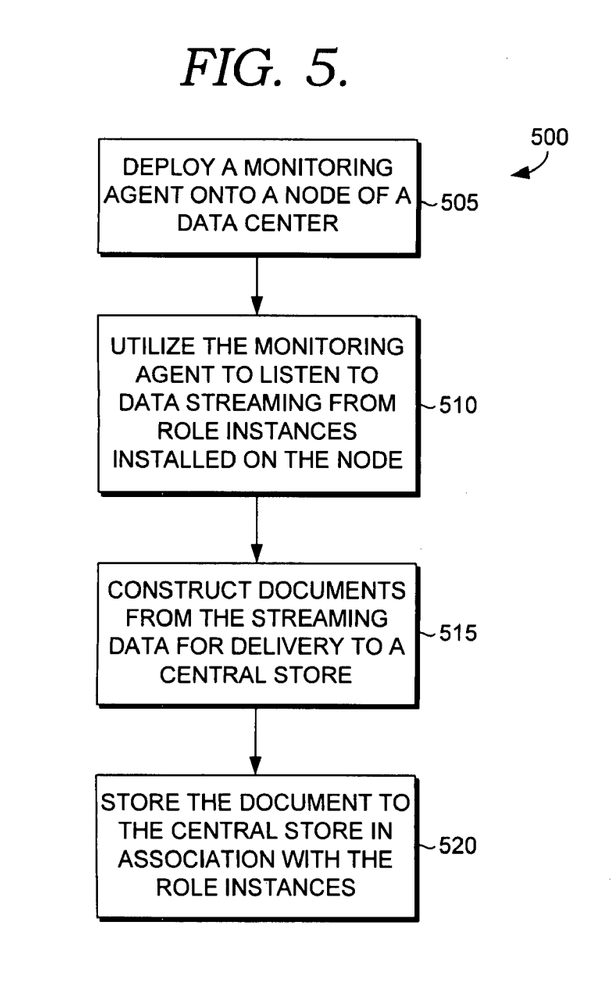
FIG. 5 is a flow diagram showing an overall method for monitoring role instances of the service application propagated throughout a distributed computing platform, in accordance with an embodiment of the present invention.

Referring now to FIG. 5, a flow diagram that illustrates an overall method 500 for monitoring role instances of the service application propagated throughout a distributed computing platform is shown, in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described. Initially, as depicted at block 505, the method 500 includes deploying a monitoring agent onto a node of a data center. In embodiments, the node represents a computing device capable of running one or more role instances of the service application within the distributed computing platform. The method 500 continues by conducting the logical steps of utilizing the monitoring agent to listen to data streaming from the role instances (see block 510), and constructing documents from the streaming data for delivery to a central store (see block 515). In an exemplary embodiment, the documents are written to a uniform structured format common to each of the role instances of the service application. As depicted at block 520, the documents are at least temporarily stored to the central store in association with the role instances which they represent.

Figure 6:
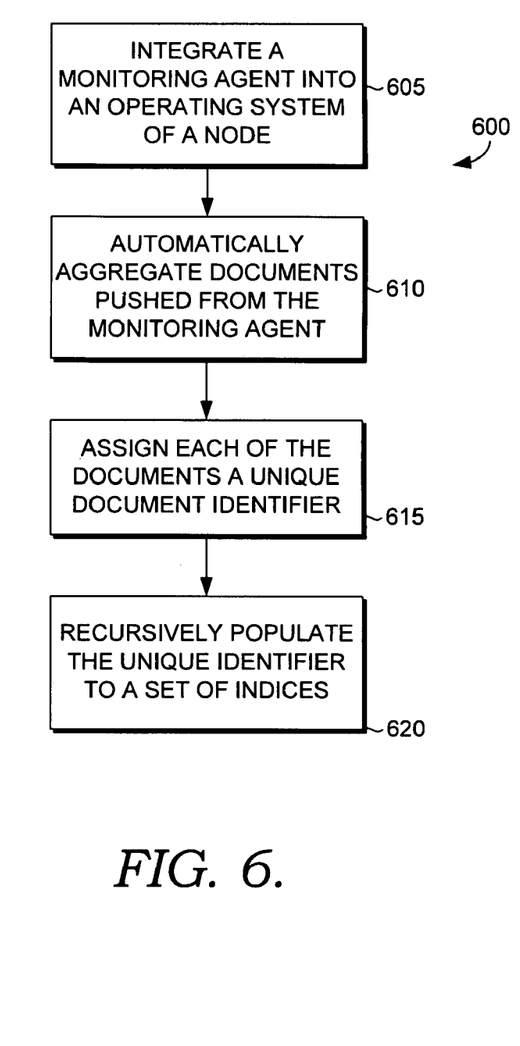
FIG. 6 is a flow diagram showing an overall method for indexing documents that encapsulate state information and event information streaming from role instances of the service application, in accordance with an embodiment of the present invention.

Turning now to FIG. 6, a flow diagram that illustrates an overall method 600 for indexing documents that encapsulate state information and event information streaming from role instances of the service application is shown, in accordance with an embodiment of the present invention. Initially, the method 600 includes integrating a monitoring agent into an operating system of a node within a distributed computing platform, as depicted at block 605. In general, the node represents a computing device capable of underlying the operation of the role instances of the service application, which is executable within the distributed computing platform. As depicted at block 610, the documents pushed from the monitoring agent are automatically aggregated. In embodiments, the documents include parameters organized in a uniform structured format that are abstracted from the state information and the event information streaming from the role instances of the service application. As discussed more fully above, the one or more role instances are replications of at least one role that comprises a component program which supports particular functional aspects of the service application. Each of the documents may be assigned a unique document identifier. This step is depicted at block 615. As depicted at block 620, the unique document identifier of each of the documents is recursively populated to the set of indices. In one instance, the set of indices is navigable for the document identifier of each of the documents based on the parameters included therein.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable storage media excluding signals per se having computer-executable instructions embodied thereon that, when executed, perform a method for monitoring one or more role instances of a service application propagated throughout a distributed computing platform, the method comprising:
    deploying a monitoring agent onto a node of a data center, wherein the node represents a computing device capable of running the one or more role instances of the service application within the distributed computing platform;
    utilizing the monitoring agent to listen to data streaming from the one or more role instances, wherein listening to the streaming data comprises:
        (a) receiving within the streaming data state information from a fabric agent, wherein the state information describes a state of the one or more role instances and includes a count of predefined events occurring at the one or more role instances; and
        (b) receiving within the streaming data event information from the one or more role instances, wherein the event information is configured to communicate, at least, an alarm and program traces to the monitoring agent;
    constructing documents from the streaming data for delivery to a central store, wherein the documents are written to a uniform structured format common to each of the one or more role instances of the service application; and
    at least temporarily storing the documents to the central store in association with the one or more role instances.

2. The computer-readable media of claim 1, wherein the method further comprises delivering the documents to the central store based on at least one of a demand from the central store or an elapse of a predefined time period.

3. The computer-readable media of claim 1, wherein the one or more role instances comprise replications of at least one role that comprises a component program that supports particular functional aspects of the service application, and wherein the monitoring agent is integrated into an operating system of each node of the data center that supports each of the one or more role instances.

4. The computer-readable media of claim 1, wherein the one or more role instances are configured to identify at least one event occurring thereon as an alarm event based on event definitions of a service model and to include the alarm within the event information passed in the streaming data upon identifying the alarm event.

5. The computer-readable media of claim 4, wherein the method further comprises:
    detecting the alarm within the streaming data;
    deriving a document from a set of attributes of the alarm; and
    routing the document to a fabric controller along a communication pathway built within the data center, wherein the communication pathway is ascertained from the set of attributes.

6. The computer-readable media of claim 5, wherein the monitoring agent is configured with an awareness of which of the one or more role instances to monitor and which portions of the event information and the state information to transfer to the documents.

7. A computerized method for monitoring one or more role instances of a service application propagated throughout a distributed computing platform, the method comprising:
- placing a monitoring agent at a node within a distributed computing platform, wherein the node represents a computing device capable of underlying the operation of the one or more role instances of the service application within the distributed computing platform;
- utilizing the monitoring agent to listen to data streaming from the one or more role instances, wherein listening to the streaming data comprises:
  - (a) receiving within the streaming data state information from a fabric agent, wherein the state information describes a state of the one or more role instances and includes a count of predefined events occurring at the one or more role, and
  - (b) receiving within the streaming data event information from the one or more role instances, wherein the event information is configured to communicate, at least, an alarm and program traces to the monitoring agent;
- constructing documents from the streaming data for delivery to a central store, wherein the documents are written to a uniform structured format common to each of the one or more role instances of the service application; and
- at least temporarily storing the documents to the central store in association with the one or more role instances.

8. The computerized method of claim 7, further comprising delivering the documents to the central store based on at least one of a demand from the central store or an elapse of a predefined time period.

9. The computerized method of claim 7, wherein the one or more role instances comprise replications of at least one role that comprises a component program that supports particular functional aspects of the service application.

10. The computerized method of claim 9, wherein the monitoring agent is integrated into an operating system of the node of the data center that supports the one or more role instances.

11. The computerized method of claim 7, wherein the one or more role instances are configured to identify at least one event occurring thereon as an alarm event based on event definitions of a service model.

12. The computerized method of claim 11, wherein the one or more role instances are further configured to include the alarm within the event information passed in the streaming data upon identifying the alarm event.

13. The computerized method of claim 12, further comprising:
- detecting the alarm within the streaming data;
- deriving a document from a set of attributes of the alarm; and
- routing the document to a fabric controller along a communication pathway built within the data center, wherein the communication pathway is ascertained from the set of attributes.

14. The computerized method of claim 7, wherein the monitoring agent is configured with an awareness of which of the one or more role instances to monitor and which portions of the event information and the state information to transfer to the documents.

15. A computer system for performing a method that monitors one or more role instances of a service application propagated throughout a distributed computing platform, the computer system comprising a processing unit coupled to a computer storage medium, the computer storage medium having stored thereon a plurality of computer software components executable by the processing unit, the computer software components comprising:
- a service model that exposes event definitions for invoking the one or more role instances of the service application to submit event information;
- the one or more role instances that embody replications of at least one role that comprises a component program of the service application, wherein the one or more role instances are configured to identify at least one event occurring thereon as an alarm event based on event definitions of a service model and to include the alarm within the event information passed in the streaming data upon identifying the alarm event; and
- a monitoring agent deployed onto a node of a data center, wherein the node represents a computing device capable of running the one or more role instances of the service application within the distributed computing platform, wherein the monitoring agent is configured to carry out at least the following operations:
  - (a) listening to the data streaming from the one or more role instances, wherein listening to the streaming data comprises:
    - (1) receiving within the streaming data state information from a fabric agent, wherein the state information describes a state of the one or more role instances and includes a count of predefined events occurring at the one or more role, and
    - (2) receiving within the streaming data the event information from the one or more role instances, wherein the event information is configured to communicate, at least, the alarm and program traces to the monitoring agent;
  - (b) constructing documents from the streaming data for delivery to a central store, wherein the documents are written to a uniform structured format common to each of the one or more role instances of the service application; and
  - (c) at least temporarily storing the documents to the central store in association with the one or more role instances.

* * * * *